US010628978B2

(12) United States Patent
Mayer et al.

(10) Patent No.: US 10,628,978 B2
(45) Date of Patent: Apr. 21, 2020

(54) METHOD AND SYSTEM FOR PROCESSING INPUT DATA FOR DISPLAY IN AN OPTIMAL VISUALIZATION FORMAT

(71) Applicant: Wipro Limited, Bangalore (IN)

(72) Inventors: David Mayer, New York, NY (US); Sundar Ramakrishnan, New York, NY (US)

(73) Assignee: Wipro Limited, Bangalore (IN)

( * ) Notice: Subject to any disclaimer, the term of this patent is extended or adjusted under 35 U.S.C. 154(b) by 45 days.

(21) Appl. No.: 15/440,316

(22) Filed: Feb. 23, 2017

(65) Prior Publication Data

US 2018/0240256 A1 Aug. 23, 2018

(51) Int. Cl.
*G06T 11/20* (2006.01)

(52) U.S. Cl.
CPC .................. *G06T 11/206* (2013.01)

(58) Field of Classification Search
CPC ...................................... G06T 11/206
See application file for complete search history.

(56) References Cited

U.S. PATENT DOCUMENTS

| | | | |
|---|---|---|---|
| 9,418,336 B2 | 8/2016 | Peev et al. | |
| 2002/0188618 A1* | 12/2002 | Ma | G06K 9/6253 |
| 2003/0120528 A1 | 6/2003 | Kruk et al. | |
| 2006/0093222 A1* | 5/2006 | Saffer | G06K 9/6218 |
| | | | 382/224 |
| 2006/0206512 A1* | 9/2006 | Hanrahan | G06F 16/248 |
| 2008/0288889 A1 | 11/2008 | Hunt et al. | |
| 2011/0261049 A1* | 10/2011 | Cardno | G06Q 10/10 |
| | | | 345/419 |
| 2012/0313947 A1* | 12/2012 | Rope | G06T 11/206 |
| | | | 345/440 |
| 2012/0327051 A1* | 12/2012 | Davies | G09G 5/10 |
| | | | 345/207 |
| 2014/0198105 A1* | 7/2014 | Gibson | G06T 11/206 |
| | | | 345/440 |
| 2015/0154281 A1* | 6/2015 | Carlsson | G06F 17/30601 |
| | | | 707/754 |
| 2015/0186806 A1* | 7/2015 | Hiltz-Laforge | G06Q 10/063 |
| | | | 705/7.11 |
| 2015/0278371 A1* | 10/2015 | Anand | G06F 16/24578 |
| | | | 707/723 |
| 2016/0165284 A1* | 6/2016 | Bargagni | H04N 21/2187 |
| | | | 725/12 |
| 2017/0076091 A1* | 3/2017 | Prophete | G06F 21/53 |

(Continued)

*Primary Examiner* — Phuc N Doan
(74) *Attorney, Agent, or Firm* — Finnegan, Henderson, Farabow, Garrett & Dunner, LLP

(57) ABSTRACT

Disclosed herein is a method and a system for processing input data for display in an optimal visualization format. The method includes receiving of the input data and identifying one or more visualization formats for displaying the input data based on preferences of the user. An optimal visualization format is identified by applying business rules on each of the identified visualization formats for displaying the input data in the optimal visualization format. In an embodiment, the instant disclosure helps in selecting a most relevant visualization format for displaying the input data. Also, one or more business interpretations and statistics related to the input data are displayed along with the input data, thereby helping users in analyzing and interpreting the input data.

10 Claims, 5 Drawing Sheets

(56) References Cited

U.S. PATENT DOCUMENTS

2017/0235466 A1* 8/2017 Tanwir .................... G06F 9/451
　　　　　　　　　　　　　　　　　　　　　　　715/738
2018/0349456 A1* 12/2018 Pogrebtsov ......... G06F 16/2228

* cited by examiner

METHOD AND SYSTEM FOR PROCESSING INPUT DATA FOR DISPLAY IN AN OPTIMAL VISUALIZATION FORMAT

TECHNICAL FIELD

The present subject matter is related, in general to data analytics and more particularly, but not exclusively to a method and system for processing input data for display in an optimal visualization format.

BACKGROUND

Generally, dashboards and other data visualization environments count on user interactions to select a most appropriate visualization format for displaying data to a user. During an era of simple visualization options and limited user interactivity, presentation of the data was suboptimal, but acceptable. Also, most times, the data visualization environments require the user to define type of data representation and visual elements to be displayed on the data visualization environments. A requirement of continuous user interactivity consumes more time and requires that users have some knowledge about the data visualization environment being used.

Further, with invent of visualization options such as Data Driven Document (D3.js) and other Java script based charting libraries, number of visualization options for a dataset have increased, making trial-and-error fitting of formats to the dataset a frustrating and time-consuming exercise.

SUMMARY

Disclosed herein is a method of processing input data for display in an optimal visualization format. The method comprises receiving, by a data visualization system, the input data from one or more data sources. Upon receiving the input data, one or more visualization formats for the input data are identified from a plurality of visualization formats based on one or more data parameters associated with the input data and user preference data related to a user. Further, the optimal visualization format is identified among the one or more visualization formats by applying one or more business rules on each of the one or more visualization formats. Upon identifying the optimal visualization format, a visualization script corresponding to the optimal visualization format is generated. Finally, the input data is displayed in the optimal visualization format using the visualization script.

Further, the present disclosure relates to a data visualization system for processing input data to display in an optimal visualization format. The data visualization system comprises a processor and a memory. The memory is communicatively coupled to the processor and stores processor-executable instructions, which, on execution, causes the processor to receive the input data from one or more data sources. Upon receiving the input data, the processor identifies one or more visualization formats from a plurality of visualization formats for the input data based on one or more data parameters associated with the input data and user preference data related to a user. Further, the processor identifies the optimal visualization format among the one or more visualization formats by applying one or more business rules on each of the one or more visualization formats. Upon identifying the optimal visualization format, the processor dynamically generates a visualization script corresponding to the optimal visualization format. Finally, the processor displays the input data in the optimal visualization format using the visualization script.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
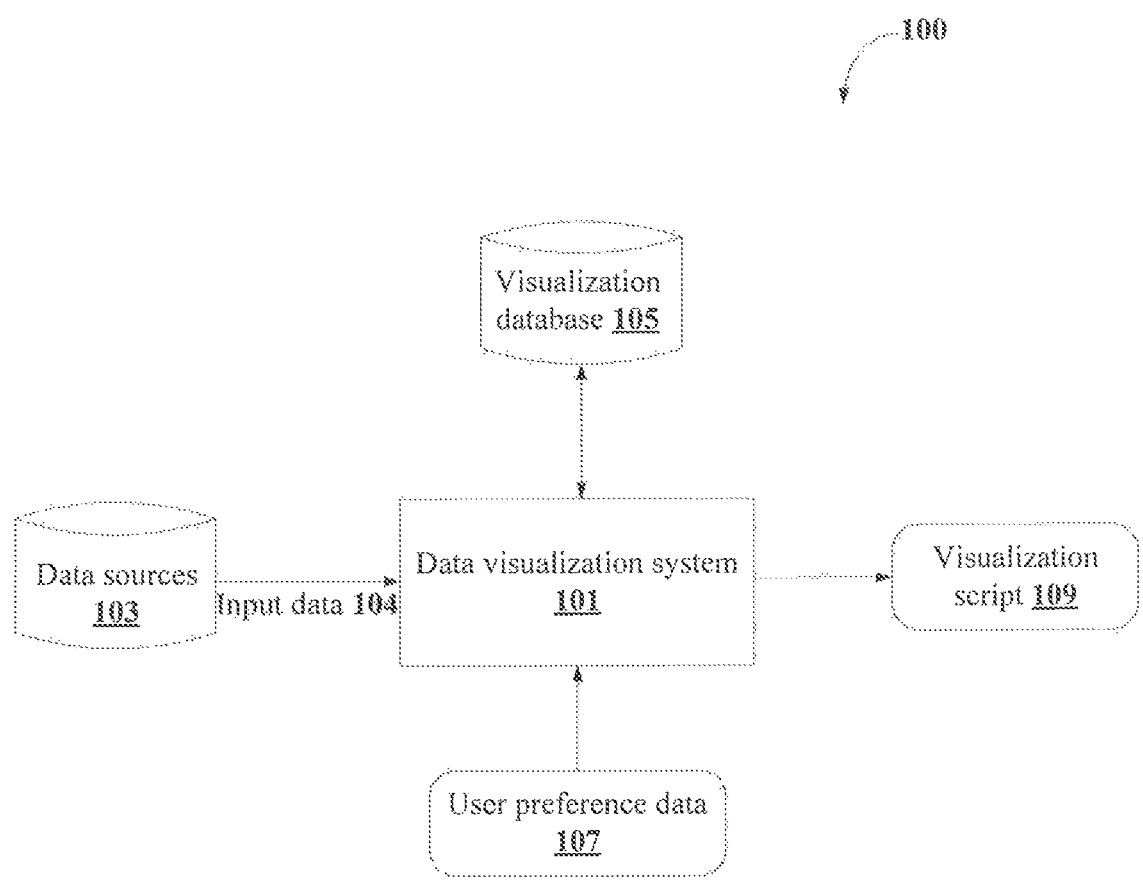
FIG. 1 shows an exemplary environment for processing input data for display in an optimal visualization format in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, hut on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a data visualization system fir processing input data for display in an optimal visualization format. The instant disclosure proposes an intelligence interface language, namely Adaptive Data Markup Language (ADML) to identify and recommend meaningful graphical representation that may be used for representing the input data. The ADML may be placed between analytics and visualization layer, to identify, analyze and recommend the most relevant and meaningful graphical view for the input data. The proposed method may include analyzing the input data to identify data pattern and variations, behaviors in time, geo characteristics, peaks, lows, differences and applying one or more business rules that may be most relevant for the input data.

The proposed method includes identifying the characteristics of the input data for selecting the best visual method that may be easy to understand, and providing relevant visualization of the input data. In some embodiments, the ADML interface may be used for identifying a best visual representation for any type of data set, produced by various business applications, without any limitation. Further, since the ADML can operate between analytical data stores and visualization tools, the ADML may also be used for reporting, preparing dashboards, applying business intelligence visuals and for monitoring real-time events using its self-reformatting feature.

Also, the method disclosed in the instant disclosure includes formatting of the input data to make the input data readable. The formatting may use various analysis techniques such as, feature recognition and variance comparison, along with past views of the user and decision rules, to recommend the most useful and relevant view for representing the processed input data.

In some embodiments, the instant disclosure eliminates the requirement of user interactions/intervention during data visualization. Hence, the users do not need to spend time in exploring various graphical view options, visual representation type or worrying about how to interpret the input data to make certain decisions on the input data. Further, the instant method provides a most beneficial chart or form of representation for the input data that is filled with business interpretations, which helps users in interpreting the input data. Also, the instant method may operate based on one or more pre-stored business rules and may be updated dynamically whenever the business evolves.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 for processing input data 104 for display in an optimal visualization format in accordance with some embodiments of the present disclosure.

The environment 100 includes a data visualization system 101 for processing the input data 104 received from one or more data sources 103 and to display the input data 104 in an optimal visualization format. As an example, the one or more data sources 103 may include, without limiting to, a Customer Relationship Management (CRM) repository associated with a user, an Enterprise Resource Planning (ERP) repository associated with the user, information related to one or more applications used by the user and one or more Big Data platforms associated with the user. In an embodiment, the input data 104 that is received from the one or more data sources 103 may include information related to business strategies, trends in business market, business applications and transactions that are related to the user. The input data 104 received from the one or more data sources 103 may be structured or unstructured based on type of the one or more data sources 103 from which the input data 104 is received.

In an embodiment, if the input data 104 received from the one or more data sources 103 is unstructured, then the data visualization system 101 may perform formatting of the input data 104 to organize and format the input data 104 into one or more pre-determined data structures such as, arrays, tables, trees, files, records and the like. Upon formatting the input data 104, the data visualization system 101 may store the formatted input data 104 in a visualization database 105 associated with the data visualization system 101.

Upon formatting and storing the input data 104 in the visualization database 105, the data visualization system 101 may identify one or more visualization formats that may be used for displaying and/or presenting the input data 104. The one or more visualization formats are different styles and patterns of visualization that may be applied on a given set of input data 104 for displaying the input data 104. For example, the one or more visualization formats may include, without limiting to, pie chart, bar chart, scatter plot and the like. In an embodiment, the one or more visualization formats may be identified and selected from a plurality of visualization formats that are stored in the visualization database 105. The one or more visualization formats for the input data 104 may be identified and selected based on one or more data parameters associated with the input data 104 and user preference data 107 related to the user. As an example, the one or more data parameters may include, without limiting to, presence of numeric variables in the input data 104 and variance and/or range of values of the numeric variables, skewness and central tendency in the input data 104. Further, the user preference data 107 may include, without limiting to, information related to most frequently used and/or preferred data visualization formats by the user.

In an embodiment, identifying the one or more visualization formats further includes analyzing each of the plurality of visualization formats previously used by the user to identify the number of times each of the plurality of visualization formats are used by the user, range of variance and skewness in the numeric variables and other related characteristics of the input data 104. Further, the data visualization system 101, may assign a relative score to each of the plurality of visualization formats based on the analysis. Finally, the data visualization system 101 selects the one or more visualization formats when the relative score assigned to the one or more of the plurality of the visualization formats is higher than a pre-determined threshold value. As an example, the pre-determined threshold value of the relative score may be 7 out of 10 on a scale of 0 to 10. In this case, each of the one or more visualization formats that have a relative score of more than 7 would be selected by the data visualization system 101.

After identifying the one or more visualization formats, the data visualization system 101 may identify an optimal visualization format among the one or more visualization formats by applying one or more business rules on each of the one or more data visualization formats. In some implementations, the one or more business rules may be pre-stored in the data visualization system 101 and the one or more pre-predetermined business rules may be directly used for identifying the optimal visualization format. In other implementations, the one or more pre-determined business rules may be dynamically modified based on the preference of the user.

Finally, the data visualization system 101 generates a visualization script 109 corresponding to the identified optimal visualization format. The visualization script 109 may be an encoded, machine-readable data script, which may include, without limiting to, information related to pattern and design of the optimal visualization format. As soon as the visualization script 109 is generated, the data visualization system 101 executes the visualization script 109 and displays the input data 104 to the user.

Figure 2:
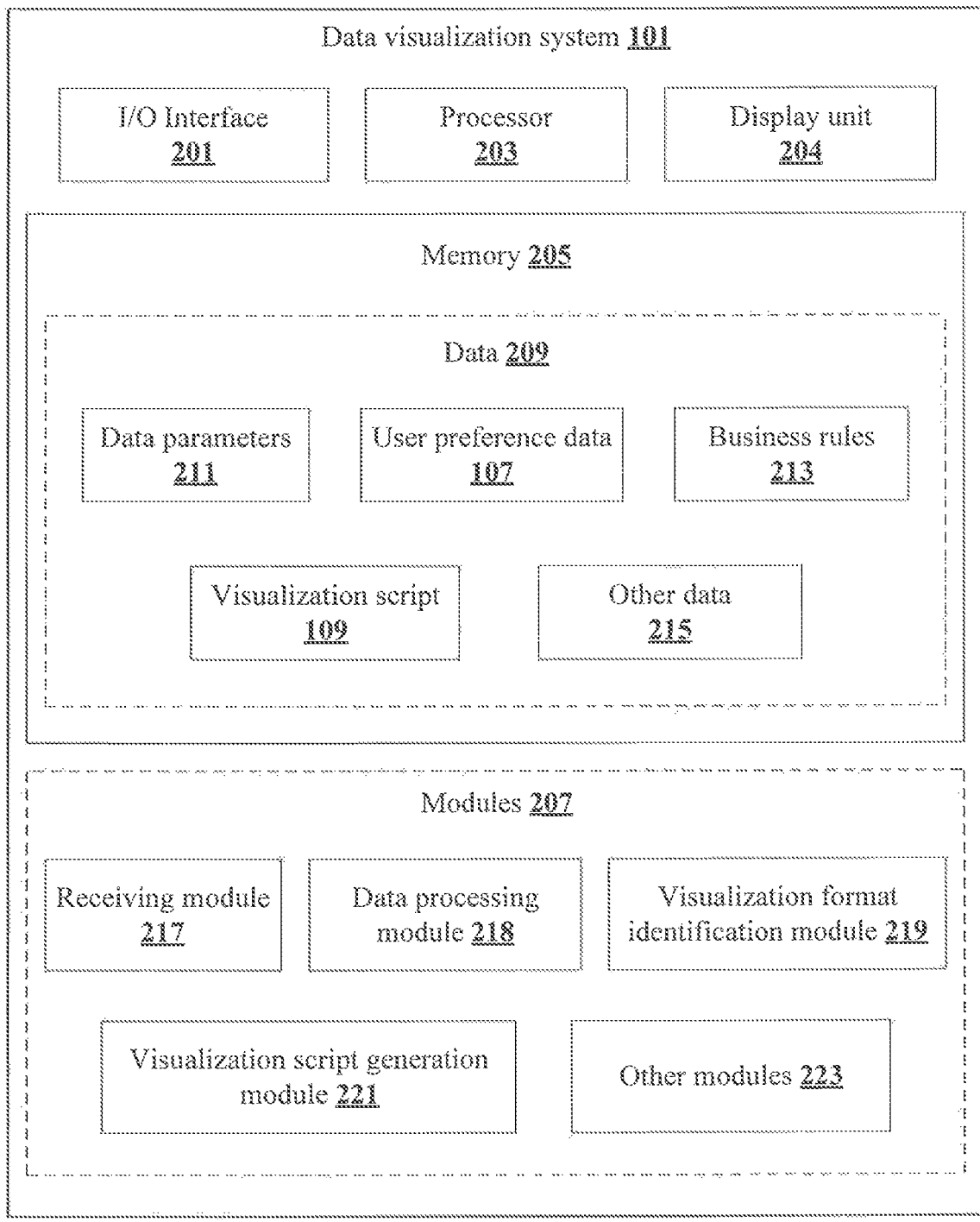
FIG. 2 shows a detailed block diagram illustrating a data visualization system for processing input data for display in the optimal visualization format in accordance with some embodiments of the present disclosure.

FIG. 2 shows a detailed block diagram illustrating the data visualization system 101 for processing the input data 104 for display in the optimal visualization format in accordance with some embodiments of the present disclosure.

The data visualization system 101 includes an I/O interface 201, a processor 203, a display unit 204 and a memory 205. The I/O interface 201 may be configured to collect the input data 104 from the one or more data sources 103 associated with the data visualization system 101. The display unit 204 may be used for displaying the input data 104 in an optimal visualization format. In an implementation, the display unit 204 may be external to the visualization system 101. The memory 205 may be communicatively coupled to the processor 203. The processor 203 may be configured to perform one or more functions of the data visualization system 101 for processing the input data 104 for displaying in the optimal visualization format. In one implementation, the data visualization system 101 may include data 209 and modules 207 for performing various operations in accordance with the embodiments of the present disclosure. In an embodiment, the data 209 may be stored within the memory 205 and may include, without limiting to, data parameters 211, the user preference data 107, business rules 213, the visualization script 109 and other data 215.

In some embodiments, the data 209 may be stored within the memory 205 in the form of various data structures. Additionally, the data 209 may be organized using data models, such as relational or hierarchical data models. The other data 215 may store data, including temporary data and temporary files, generated by the modules 207 for performing the various functions of the data visualization system 101.

In some embodiments, the data 209 may be processed by one or more modules 207 of the data visualization system 101. In one implementation, the one or more modules 207 may be stored as a part of the processor 203. In another implementation, the one or more modules 207 may be communicatively coupled to the processor 203 for performing one or more functions of the data visualization system 101. The modules 207 may include, without limiting to, a receiving module 217, a data processing module 218, a visualization format identification module 219, a visualization script generation module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the data visualization system 101. It will be appreciated that such modules 207 may be represented as a single module or a combination of different modules.

In some embodiments, the receiving module 217 may be responsible for receiving the input data 104 from the one or more data sources 103. As an example, the one or more data sources 103 may include, without limiting to, a Customer Relationship Management (CRM) repository associated with the user, an Enterprise Resource Planning (ERP) repository associated with the user, information related to one or more applications used by the user and one or more Big Data platforms associated with the user.

In some embodiments, the data processing module 218 may be responsible for processing the input data 104 received from the one or more data sources 103. The input data 104 may be structured or unstructured. If the input data 104 is unstructured, then the data processing module 218 may format the unstructured input data 104 into a structured data format and then makes the formatted input data 104 available for analytics. Further, the formatted input data 104 may be stored in the visualization database 105 prior to identifying the one or more visualization formats for representing the input data 104.

In some embodiments, the processing of the input data 104 may further include scanning of the formatted input data 104 to create a data object corresponding to the input data 104 in an appropriate programming language. As an example, the programming languages used for creating the data object may be one of 'R' programming language, 'Python' programming language and the like. Creating the data objects for the input data 104 further includes checking for presence of numerical and categorical variables, i.e., columns in the input data 104. Similarly, an identity of rows, i.e., an index of the input data 104 may be identified.

Suppose, if values of all the numeric and categorical fields (columns) are different for all the indexes (rows), then the data processing module 218 may cheek for high variance and skewness in the input data 104. Then, each column of the input data 104 may be arranged in an order of decreasing variance and skewness. Here, the basic concept is that, the variables with maximum variance and skewness would give maximum information regarding the data. The data object created by the data processing module 218 may be analyzed by the visualization format identification module 219 during identifying the one or more visualization formats from the plurality of the visualization formats.

In some embodiments, the visualization format identification module 219 may be responsible for identifying the one or more visualization formats that can be used for display of the input data 104, from the plurality of the visualization formats stored in the visualization database 105. Initially, the visualization format identification module 219 may identify and analyze each of the plurality of the visualization format which are previously used and/or preferred by the user for viewing a similar type of the input data 104. Based on the analysis, the visualization format identification module 219 may determine a frequency of usage, that is, the number of times in which each of the plurality of visualization formats are previously used by the user.

Further, based on the frequency of usage of the plurality of the visualization parameters and the data parameters 211 associated with the input data 104, the visualization format identification module 219 may assign a relative score to each of the plurality of the visualization formats. The data parameters 211 may include, without limiting to, presence of numeric variables in the input data 104, range of variance and skewness in numeric variables and the like. As an example, the visualization format identification module 219 may check for the last 10 visualization formats preferred by the user and then assign a score to each of the previously used visualization formats based on the frequency of usage of each of the visualization formats with respect to variance and skewness in the past input data 104.

Suppose, the user has preferred a visualization format say, the bar chart, during 5 out of 10 previous instances, then the visualization format identification module 219 may assign a relative score of 5 for the bar chart visualization format. Similarly, if the user has preferred the pie chart visualization format during 4 previous instances, then the relative score assigned to the pie chart visualization format may be 4. Upon analyzing and assigning the relative scores to each of the plurality of the visualization formats, the one or more visualization formats having a relative score more than a pre-determined threshold value, say 3 out of 10, may be selected by the visualization format identification module 219.

Further, the visualization format identification module 219 includes identifying an optimal visualization format among the one or more visualization formats selected from the plurality of the visualization formats by applying one or more business rules 213 on each of the one or more visualization formats. In an embodiment, the one or more business rules 213 may be applied on the formatted input data 104 with respect to each of the one or more visualization formats for selecting a visualization format that is best suited to display the input data 104. In some embodiments, the one or more business rules 213 may be edited, updated and new rules may be added as required by the user.

In an embodiment, the visualization script generation module 221 may be responsible for dynamically generating the visualization script 109 corresponding to the optimal visualization format for displaying the input data 104 in the optimal visualization format. The visualization script 109 may be a data markup language compliant data file that includes information about design and data models of the optimal visualization format selected for visualizing the input data 104. In an implementation, the visualization script 109 may be executed at the display unit 204 of the data visualization system 101 for displaying the input data 104 in the optimal visualization format. The visualization script 109 may be dynamically updated whenever there is change in the one or more business rules 213 or based on the user preference. As an example, the user preference data 107 may include, without limiting to, information related to most frequently used and/or preferred data visualization formats by the user.

Figure 3:
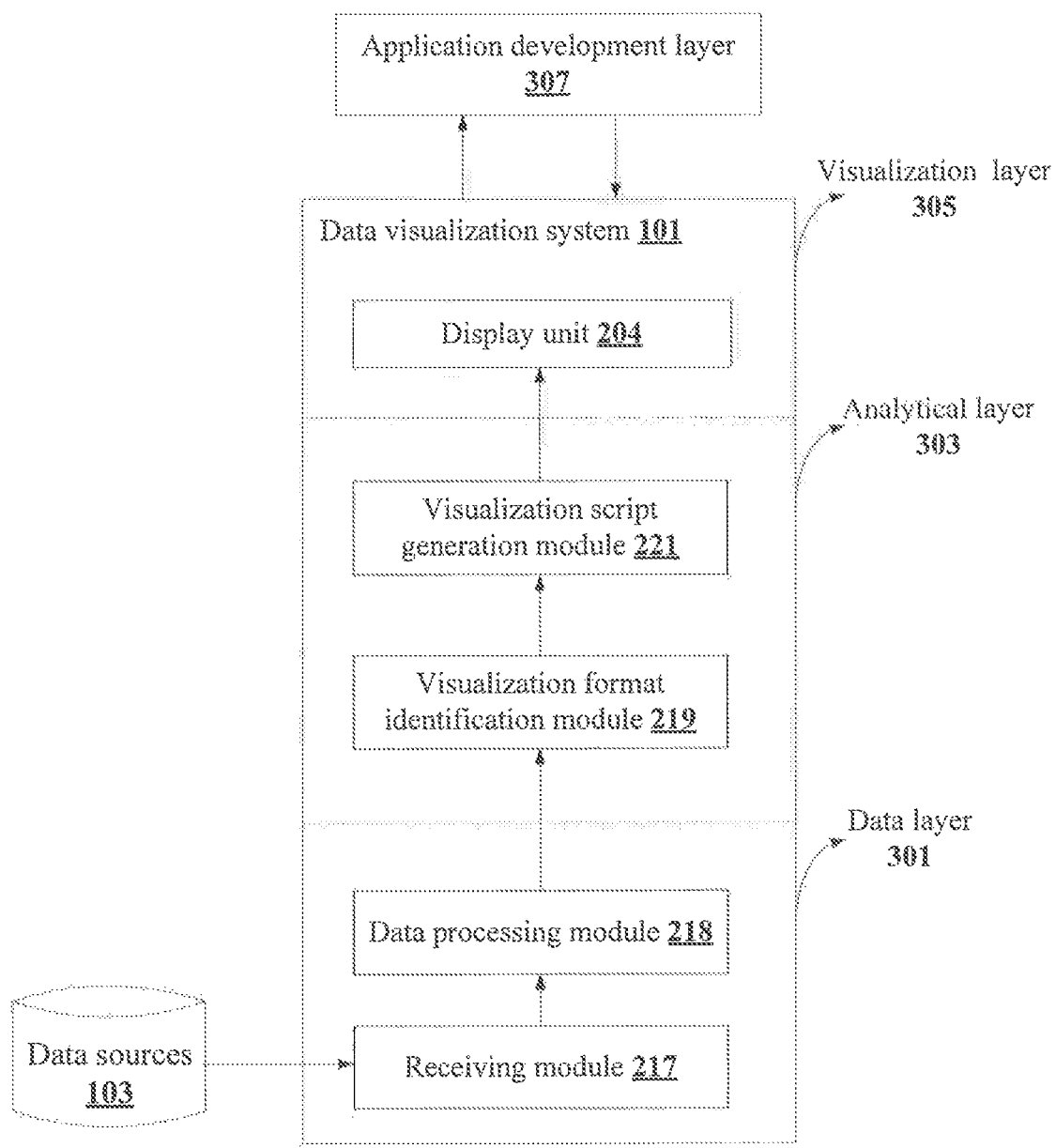
FIG. 3 shows architecture of the data visualization system in accordance with some embodiments of the present disclosure.

FIG. 3 shows architecture of the data visualization system 101 in accordance with some embodiments of the present disclosure.

The operation and architecture of the data visualization system 101 may be classified into three distinct layers, namely a data layer 301, an analytical layer 303 and a visualization layer 305. The data layer 301 may include the input data 104, the receiving module 217 and the data processing module 213. At the data layer 301, the data visualization system 101 receives the input data 104 from the one or more data sources 103 using the receiving module 217. Further, the input data 104 received from the data sources 103 are processed using the data processing module 218 for formatting and storing the input data 104 in the visualization database 105 (not show in FIG. 3).

The analytical layer 303 includes the visualization format identification module 219, which is responsible for identifying the one or more visualization formats from the plurality of the visualization formats by analyzing each of the plurality of the visualization formats. Further, the analytical layer 303 may also include various analytical and business rules 213 that are applied on the input data 104 to identify a best-fit match visualization format that can be used for displaying the input data 104. The process of identifying the optimal visualization format by applying the one or more business rules 213 on the one or more visualization formats is also performed in the analytical layer 303. Finally, the visualization script generation module 221 may generate a visualization script 109 corresponding to the optimal visualization format.

At the visualization layer 305, the data visualization system 101 includes executing the visualization script 109 corresponding to the optimal visualization format and then displaying the input data 104 in the optimal visualization format on the display unit 204. In some implementations, the display unit 204 may be a general-purpose display element such as a display monitor, a projector display unit 204 and the like, which is associated with the data visualization system 101. In other implementations, the display unit 204 may be a Graphical User Interface (GUI) based display unit 204, which allows the user to interactively communicate with the data visualization system 101 during visualization of the input data 104.

In an embodiment, the application development layer 307 may be an external application environment that include various business applications and business dashboards that are used by the user to interpret, analyze and understand the input data 104 which is displayed in the optimal visualization format on the display unit 204. In an implementation, the application development layer 307 may be integrated within the display unit 204 of the data visualization system 101, thereby allowing the users to interact with the data visualization system 101 using through the business dashboards in the application development layer 307.

Figure 4:
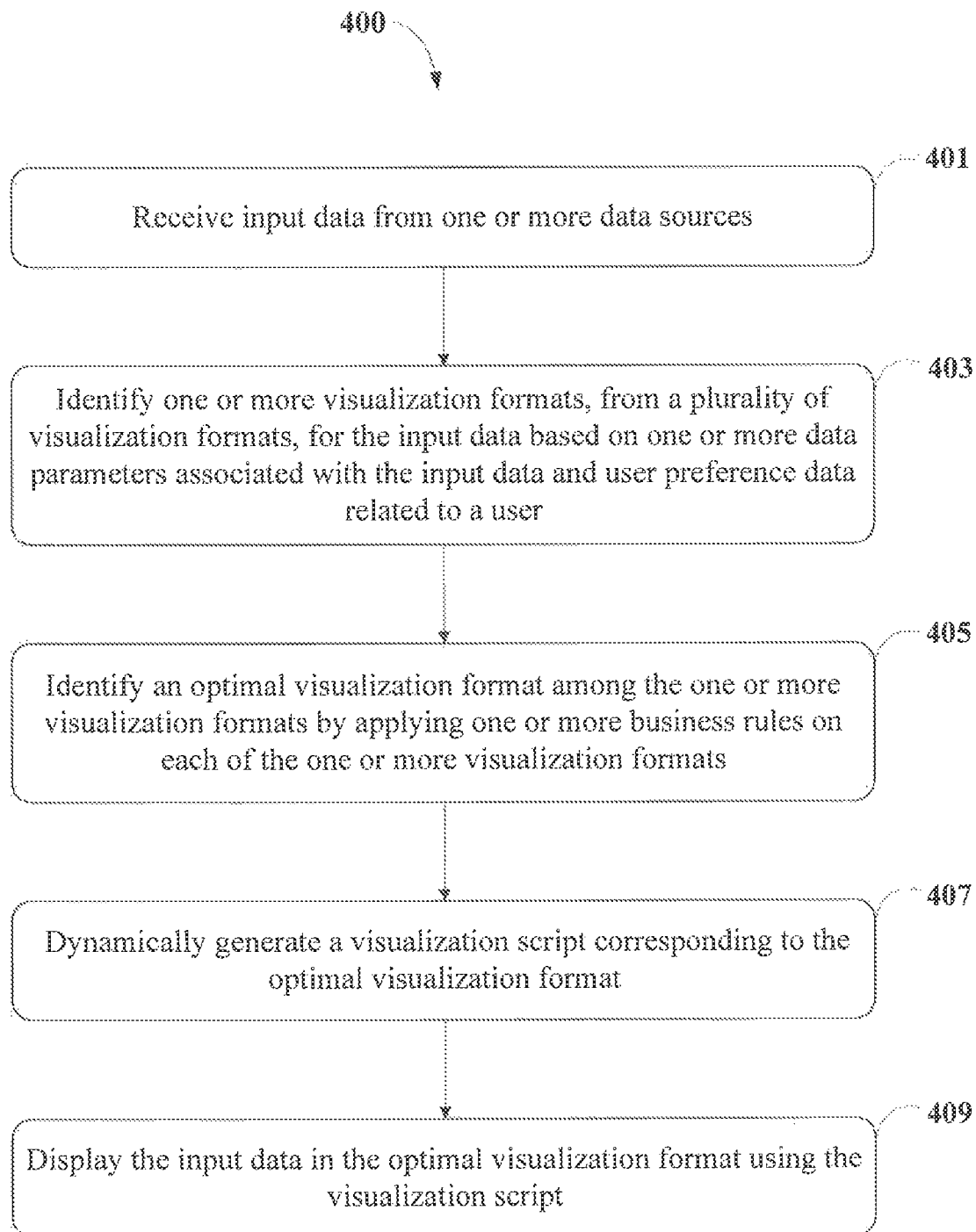
FIG. 4 shows a flowchart illustrating a method of processing input data for display in an optimal visualization format in accordance with some embodiments of the present disclosure.

FIG. 4 shows a flowchart illustrating a method of processing input data 104 for display in an optimal visualization format in accordance with some embodiments of the present disclosure.

As illustrated in FIG. 4, the method 400 includes one or more blocks illustrating a method of processing input data 104 for display in an optimal visualization format using a data visualization system 101. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401 of the method 400, the data visualization system 101 may receive the input data 104 from one or more data sources 103. As an example, the one or more data sources 103 may include, without limiting to, at least one of a Customer Relationship Management (CRM) repository associated with the user, an Enterprise Resource Planning (ERP) repository associated with the user, information related to one or more applications used by the user and one or more Big Data platforms associated with the user.

At block 403 of the method 400, the data visualization system 101 may identify one or more visualization formats from a plurality of visualization formats for the input data 104 based on one or more data parameters 211 associated with the input data 104 and user preference data 107 related to a user. As an example, the one or more data parameters 211 includes at least one of presence of numeric variables in the input data 104 and variance, skewness and central tendency in the numeric variables. In an embodiment, the plurality of visualization formats may be stored in a visualization database 105 associated with the data visualization system 101.

At block 405 of the method 400, the data visualization system 101 may identify the optimal visualization format among the one or more visualization formats by applying one or more business rules 213 on each of the one or more visualization formats. In some embodiments, initially, the data visualization system 101 may analyze each of the plurality of visualization formats that are previously used by the user. Then, the data visualization system 101 may assign a relative score to each of the plurality of visualization formats based on number of times each of the plurality of visualization formats are used by the user, range of variance and skewness in numeric variables and characteristics of the input data 104. Finally, the data visualization system 101 selects the one or more visualization formats from the plurality of the visualization formats when the relative score assigned to the one or more of the plurality of the virtualization formats is higher than a pre-determined threshold value.

At block 407 of the method 400, the data visualization system 101 may dynamically generate a visualization script 109 corresponding to the optimal visualization format. The visualization script 109 may be a data markup language compliant data file that includes information about design and data models of the optimal visualization format selected for visualizing the input data 104.

At block 409 of the method 400, the data visualization system 101 displays the input data 104 in the optimal visualization format using the visualization script 109. In an embodiment, the input data 104 may be displayed on a display unit 204 associated with the data visualization system 101.

Computer System

Figure 5:
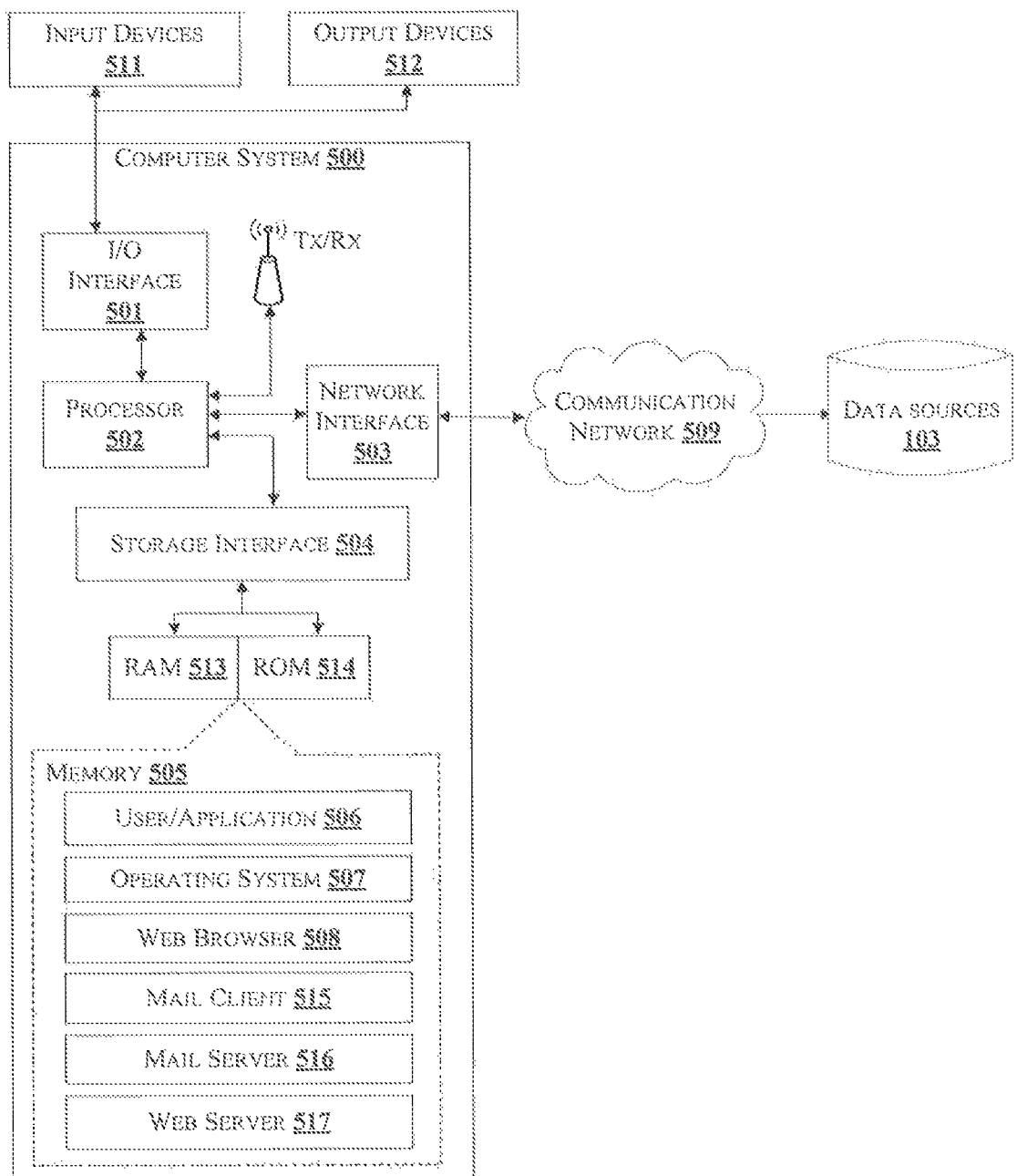
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the data visualization system 101 which is used for processing input data 104 for display in an optimal visualization format. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512). In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more data sources 103 for collecting the input data 104. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application 506, an operating system 507, web browser 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500.

Examples of operating systems include, without limitation, Apple Macintosh OS X, UNIX, Unix-like system distributions (e.g., Berkeley Software Distribution (BSD), FreeBSD, Net BSD, Open BSD, Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interlace elements on a display system operatively connected to the computer system 500, such as cursors, icons, check boxes, menus, windows, widgets, etc. Graphical User interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (MS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server 516 may be an Internet mail server such as Microsoft Exchange, or the like. The mail server 516 may utilize facilities such as Active Server Pages (ASP), ActiveX, American National Standards institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client 515. The mail client 515 may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. (Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method of processing input data for display in an optimal visualization format.

In an embodiment, the method of the present disclosure provides a predictive intelligence technique, which scores each visualization format and helps in selecting the most relevant visualization format that is best suited for displaying the given input data.

In an embodiment, the method of the present disclosure takes into consideration the interests and preferences of the user while selecting an optimal visualization format to be used for displaying the input data related to the user.

In an embodiment, the method of the present disclosure provides one or more business interpretations and statistics during display of the input data, thereby helping users in analysis and interpretation of the input data.

In an embodiment, the method of the present disclosure can identify and provide a most suitable visualization format for a user, without requiring any user intervention.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be clear that more than one device/article (irrespective of whether they cooperate) may be used in place of a single device/article. Similarly, where more than one device or article is described herein (irrespective of whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Data visualization system |
| 103 | Data sources |
| 104 | Input data |
| 105 | Visualization database |
| 107 | User preference data |
| 109 | Visualization script |
| 201 | I/O Interface |
| 203 | Processor |
| 204 | Display unit |
| 205 | Memory |
| 207 | Modules |
| 209 | Data |
| 211 | Data parameters |
| 213 | Business rules |
| 215 | Other data |
| 217 | Receiving module |
| 218 | Data processing module |
| 219 | Visualization format identification module |
| 221 | Visualization script generation module |
| 223 | Other modules |

What is claimed is:

1. A method of processing input data for display in an optimal visualization format, the method comprising:
   receiving, by a data visualization system, the input data from one or more data sources;
   scanning, by the data visualization system, the received input data to create a data object corresponding to the received input data, wherein the data object is created by checking for presence of numerical and categorical variables and an index of the received input data;
   identifying, by the data visualization system, a plurality of visualization formats previously used by the user based on the data object, wherein the plurality of visualization formats include past input data that is similar to the received input data;
   assigning, by the data visualization system, a relative score to each of the plurality of visualization formats based on number of times each of the plurality of visualization formats being used by the user with respect to variance and skewness in numeric variables of the past input data;
   selecting, by the data visualization system, one or more visualization formats from the plurality of the visualization formats when the relative score assigned to the one or more of the plurality of the visualization formats is higher than a predetermined threshold value;
   identifying, by the data visualization system, the optimal visualization format among the one or more visualization formats by applying one or more business rules on each of the one or more visualization formats;
   generating dynamically, by the data visualization system, a visualization script corresponding to the optimal visualization format; and
   displaying, by the data visualization system, the received input data in the optimal visualization format using the visualization script.

2. The method as claimed in claim 1, wherein the one or more data sources comprises at least one of a Customer Relationship Management (CRM) repository associated with the user, an Enterprise Resource Planning (ERP) repository associated with the user, information related to one or more applications used by the user, and one or more Big Data platforms associated with the user.

3. The method as claimed in claim 1, wherein the plurality of visualization formats is stored in a visualization database associated with the data visualization system.

4. The method as claimed in claim 3 and further comprising:
   formatting the received input data and storing formatted input data in the visualization database prior to identifying the plurality of visualization formats.

5. The method as claimed in claim 1, wherein the one or more business rules are dynamically modified based on preference of the user.

6. A data visualization system for processing input data to display in an optimal visualization format, the data visualization system comprises:
   a processor; and
   a memory, communicatively coupled to the processor, wherein the memory stores processor-executable instructions, which, on execution, causes the processor to:
      receive the input data from one or more data sources;
      scan the received input data to create a data object corresponding to the received input data, wherein the data object is created by checking for presence of numerical and categorical variables and an index of the received input data;
      identify a plurality of visualization formats previously used by the user based on the data object, wherein the plurality of visualization formats include past input data that is similar to the received input data;
      assign a relative score to each of the plurality of visualization formats based on number of times each of the plurality of visualization formats being used by the user with respect to variance and skewness in numeric variables of the past input data;
      select one or more visualization formats from the plurality of the visualization formats when the relative score assigned to the one or more of the plurality of the visualization formats is higher than a predetermined threshold value;
      identify the optimal visualization format among the one or more visualization formats by applying one or more business rules on each of the one or more visualization formats;
      dynamically generate a visualization script corresponding to the optimal visualization format; and
      display the received input data in the optimal visualization format using the visualization script.

7. The data visualization system as claimed in claim 6, wherein the one or more data sources comprises at least one of a Customer Relationship Management (CRM) repository associated with the user, an Enterprise Resource Planning (ERP) repository associated with the user, information related to one or more applications used by the user, and one or more Big Data platforms associated with the user.

8. The data visualization system as claimed in claim 6, wherein the processor stores the plurality of visualization formats in a visualization database associated with the data visualization system.

9. The data visualization system as claimed in claim 8, wherein the processor formats the received input data and stores formatted input data in the visualization database prior to identifying the plurality of visualization formats.

10. The data visualization system as claimed in claim 6, wherein the processor dynamically modifies the one or more business rules based on preference of the user.

\* \* \* \* \*